H. F. MARTZ.
MAGNETIC GEAR SHIFTER.
APPLICATION FILED MAR. 9, 1918.
1,286,700.
Patented Dec. 3, 1918.
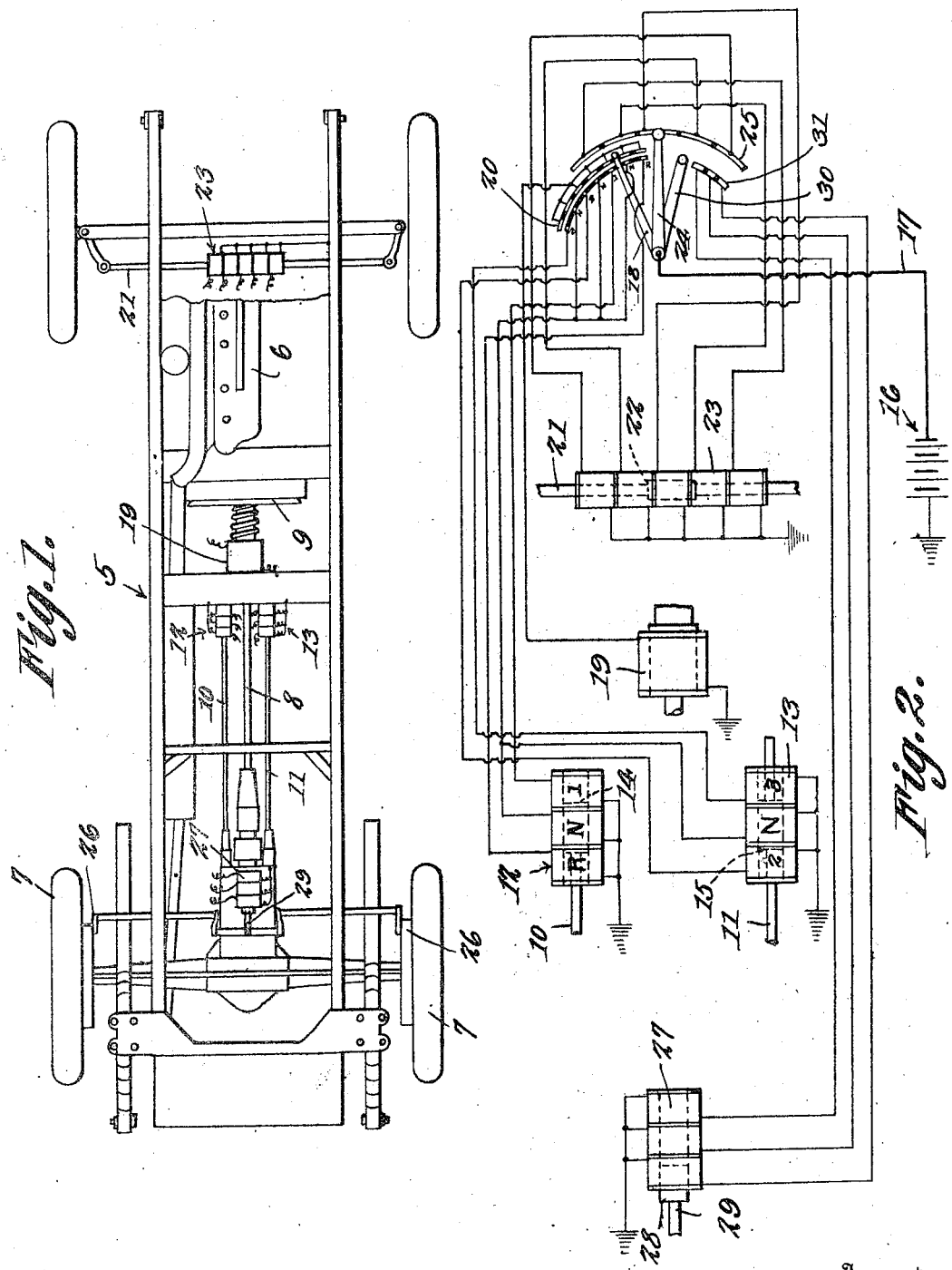
Inventor
Henry F. Martz.
By Henry J. Brewington.
Attorney

UNITED STATES PATENT OFFICE.

HENRY F. MARTZ, OF LIBERTY PARK, MARYLAND.

MAGNETIC GEAR-SHIFTER.

1,286,700.                Specification of Letters Patent.       Patented Dec. 3, 1918.

Application filed March 9, 1918.   Serial No. 221,433.

*To all whom it may concern:*

Be it known that I, HENRY F. MARTZ, a citizen of the United States, residing at Liberty Park, in the county of Baltimore and State of Maryland, have invented certain new and useful Improvements in Magnetic Gear-Shifters, of which the following is a specification.

This invention relates to the controlling means of motor vehicles, and its object is to provide a novel and improved electric control system for the clutch and the power transmission mechanism, and also to provide such a system by which the vehicle is steered.

The objects stated are attained by means of a combination and arrangement of parts to be hereinafter described and claimed, and in order that the same may be better understood, reference is had to the accompanying drawing forming a part of this specification.

In the drawing, Figure 1 is a plan view of a motor vehicle showing the application of the invention, only so much of the vehicle being shown as will suffice to an understanding of the invention, and Fig. 2 is a diagram showing the electric circuits.

Referring specifically to the drawing, 5 denotes a motor vehicle, the power source of which is the usual internal-combustion engine shown diagrammatically at 6. The hind wheels 7 are driven by the propeller shaft 8 through the usual differential gearing which has not been illustrated as it is well known and forms no part of the present invention. The shaft 8 is connected to the engine shaft by a clutch 9 of any suitable type. A variable speed transmission gearing is also provided by which three forward speeds and one reverse drive are obtained. This gearing is of the slidable gear type, the gears being shifted by rods 10 and 11, respectively. As this type of transmission gearing is well known and its structure is immaterial to the present invention, it has not been illustrated in detail.

The gear shifting rods 10 and 11 are actuated by solenoids shown diagrammatically at 12 and 13, respectively. Each solenoid is in three sections which are in axial alinement. A single core is provided for the solenoid, said core being slidable from one section to the other according to which section is energized. The sections of the solenoid 12 are marked "R", "N" and "1", respectively, in Fig. 2, meaning that when its core is drawn into the section "R" the proper gears are shifted to obtain a reverse drive, when the core is drawn into the section "N" the gears are in neutral position, and when the core is drawn into the section "1" the first speed ahead is obtained. The solenoid 13 has its sections marked "2", "N" and "3", and its core is shown at 15. This solenoid sets the gears to the second and third speeds, with a neutral position therebetween, the same as the solenoid 12. The solenoid core 14 is connected to the gear shift lever or rod 10, and the core 15 is connected to the gear shift rod 11.

At 16 is shown a battery or other source of electric current. One side of the battery is grounded, and a conductor 17 is connected to its other side and leads to a switch lever 18 mounted to travel over a series of switch contacts marked "R", "N", "1", "N", "2", "N" and "3", respectively, these contacts being wired to corresponding solenoid sections of the solenoids 12 and 13. The two solenoids are grounded. It will therefore be seen that when the switch lever 18 is on any one of the contacts, a corresponding solenoid section is energized and the proper gears are shifted to obtain the desired speed. It will be noted that the solenoid sections which place the gears in neutral position, and their corresponding switch contacts alternate with the solenoid sections which control the different speed and their corresponding switch contacts, and hence the gears are always placed in neutral position before a change of speed is obtained, this being the usual practice in the ordinary manually operated gear shifts.

A single solenoid operates the clutch 9, this solenoid being shown at 19, and its core being connected to the clutch shifter in any suitable manner. One side of this solenoid is grounded, and its other side is connected to a series of switch contacts 20 opposite the contacts marked "R", "N", "1", etc., which control the gear shifting solenoids. The switch lever 18 also travels over the contacts 20 and therefore controls the clutch shifter solenoid 19. It will be noted that the contacts 20 are opposite the contacts "R", "N", "1", etc., and hence, when the lever 18 is swung to obtain any desired speed change, the clutch 9 is first disengaged, this being due to the fact that the first-mentioned contacts are longer than the second-mentioned ones, so that the switch lever engages the former before it reaches the latter.

The car is also provided with an electrically controlled steering mechanism. The spindle connecting rod 21 is connected to the core 22 of a solenoid 23 consisting of a plurality of sections arranged in longitudinal alinement. When the car is traveling straight ahead, the core 22 is in the middle section of the solenoid as shown in Fig. 2, and upon energizing one or more of the sections to the right or the left, the rod 21 is shifted to move the front wheels according to the direction it is desired that the car take. The extent to which the rod 21 is shifted depends on the number of solenoid sections which are energized. For a sharp turn, all the solenoid sections to the right or left of the middle one should be energized.

The steering solenoid 23 is controlled by a switch lever 24 connected to one side of the current source 16 by the conductor 17. This lever operates over a series of switch contacts 25 connected to the respective solenoid sections, the latter being grounded.

The car is also provided with an electrically controlled brake 26, the control being had by a solenoid 27 consisting of three or more sections to obtain different degrees of braking force. These sections are in alinement and a single core is movable from one into the other, the same as the previously described solenoids. This core is shown at 28, it being connected to a rod 29 which is connected in any suitable manner to the brake actuating means.

The brake solenoid 27 is controlled by a switch lever 30 connected by the conductor 17 to the current source 16, and operating in conjunction with switch contacts 31 wired to the sections of said solenoid, the same being grounded as shown.

The invention provides for a complete control of the car electrically, and as the switches are in one place, the control is readily effected.

I claim:

1. In a motor vehicle, a variable speed transmission gearing, shifting means therefor, electro-responsive means for actuating the shifting means, the various speed changes alternating with neutral positions of the gears, a clutch, electro-responsive means for shifting the clutch, and a switch controlling both of said electro-responsive means, said switch effecting the actuation of the clutch previous to the shifting of the gears, and having contacts corresponding to the neutral positions of the gear shifts, said contacts alternating with contacts corresponding to the various gear shifts.

2. In a motor vehicle, a variable speed transmission gearing, shifting means therefor, a solenoid for actuating the shifting means, said solenoid comprising alined sections adapted to be independently energized and containing a single core which is operatively connected to the gear shifting means and is movable from one solenoid section to another, and said core when in one of the sections placing the gears in neutral position, the last mentioned section being alternately arranged with respect to the other sections, and a switch for selectively controlling the solenoid sections.

3. In a motor vehicle, a variable speed transmission gearing, shifting means therefor, a solenoid for actuating the shifting means, said solenoid comprising alined sections adapted to be independently energized and containing a single core which is operatively connected to the gear shifting means and is movable from one solenoid section to another, said core when in one of the sections placing the gears in neutral position, the last-mentioned section being alternately arranged with respect to the other sections, a switch for selectively controlling the solenoid sections, a clutch, electro-responsive means for shifting the clutch, and a switch controlling said electro-responsive means, said switch effecting the actuation of the clutch previous to the shifting of the gears, and the first-mentioned switch having contacts corresponding to the neutral positions of the gear shifts, said contacts alternating with contacts corresponding to the various gear shifts.

In testimony whereof I affix my signature in the presence of two witnesses.

HENRY F. MARTZ.

Witnesses:
 HOWARD D. ADAMS,
 E. WALTON BREWINGTON.